(12) United States Patent  (10) Patent No.: US 8,958,013 B2
Zinovieva  (45) Date of Patent: Feb. 17, 2015

(54) ALIGNING VIDEO CLIPS TO CLOSED CAPTION FILES

(75) Inventor: Nina Vladimirovna Zinovieva, Lowell, MA (US)

(73) Assignee: Ramp Holdings, Inc., Woburn, MA (US)

( * ) Notice: Subject to any disclaimer, the term of this patent is extended or adjusted under 35 U.S.C. 154(b) by 0 days.

(21) Appl. No.: 13/278,585

(22) Filed: Oct. 21, 2011

(65) Prior Publication Data

US 2013/0100347 A1   Apr. 25, 2013

(51) Int. Cl.
H04N 7/00 (2011.01)
H04N 11/00 (2006.01)
G11B 27/28 (2006.01)
H04N 7/088 (2006.01)
H04N 21/43 (2011.01)
H04N 21/439 (2011.01)
H04N 21/488 (2011.01)
G11B 27/031 (2006.01)
G11B 27/10 (2006.01)

(52) U.S. Cl.
CPC .............. *G11B 27/28* (2013.01); *H04N 7/0885* (2013.01); *H04N 21/4307* (2013.01); *H04N 21/4394* (2013.01); *H04N 21/4884* (2013.01); *G11B 27/031* (2013.01); *G11B 27/10* (2013.01)
USPC .......................................... 348/468; 348/462

(58) Field of Classification Search
USPC ......... 348/465–468, 461–462, 473, 563–564, 348/569, 725; 704/211, 235, 244, 256, 231
IPC ............................................... H04N 7/00,11/00
See application file for complete search history.

(56) References Cited

U.S. PATENT DOCUMENTS

| 5,737,725 | A * | 4/1998 | Case ............................. 704/260 |
| 6,260,011 | B1 * | 7/2001 | Heckerman et al. .......... 704/235 |
| 6,505,153 | B1 * | 1/2003 | Van Thong et al. ........... 704/211 |
| 7,013,273 | B2 * | 3/2006 | Kahn ............................ 704/235 |
| 7,443,449 | B2 * | 10/2008 | Momosaki et al. ........... 348/468 |

* cited by examiner

*Primary Examiner* — Trang U Tran
(74) *Attorney, Agent, or Firm* — Chapin IP Law, LLC

(57) ABSTRACT

Methods and apparatus, including computer program products, for aligning video clips to closed caption files. A method includes receiving a video clip, applying speech-to-text to the received video clip, applying an initial alignment of the speech-to-text output to candidate closed caption text in a closed caption file, identifying one or more islands, and outputting the video clip with the aligned closed caption text.

22 Claims, 5 Drawing Sheets

Candidate closed caption file (start):

| | |
|---|---|
| 14:57:29,765 --> 14:57:31,833 | NORTH AMERICA'S NATURAL GAS PRODUCERS |
| 14:57:31,868 --> 14:57:33,870 | ARE COMMITTED TO SAFELY AND RESPONSIBLY |
| 14:57:33,904 --> 14:57:36,202 | PROVIDING GENERATIONS OF CLEANER BURNING ENERGY |
| 14:57:36,237 --> 14:57:37,536 | FOR OUR COUNTRY. |
| 14:57:37,570 --> 14:57:38,903 | DRILLING THOUSANDS OF FEET BELOW |
| 14:57:38,938 --> 14:57:40,307 | FRESH WATER SOURCES, |
| 14:57:40,341 --> 14:57:42,444 | WITHIN SELF-CONTAINED WELL SYSTEMS, |
| 14:57:42,478 --> 14:57:45,080 | AND USING STATE OF THE ART MONITORING TECHNOLOGIES |
| 14:57:45,115 --> 14:57:46,749 | RIGOROUS PRACTICES HELP ENSURE |
| 14:57:46,783 --> 14:57:48,717 | OUR OPERATIONS ARE SAFE AND CLEAN |
| 14:57:48,751 --> 14:57:51,150 | FOR OUR COMMUNITIES AND THE ENVIRONMENT. |
| 14:57:51,184 --> 14:57:53,218 | WE'RE AMERICA'S NATURAL GAS. |
| 14:57:54,488 --> 14:57:56,957 | Like so many great pioneers before me, |
| 14:57:56,991 --> 14:57:59,124 | guided only by a dream. |
| 14:57:59,158 --> 14:58:02,428 | I'm embarking on a journey of epic proportion. |
| 14:58:02,463 --> 14:58:05,932 | I will travel, from sea to shining sea, |
| 14:58:05,966 --> 14:58:08,133 | through amber waves of grain, |
| 14:58:08,168 --> 14:58:09,068 | and I won't stop |
| 14:58:09,103 --> 14:58:11,504 | until I've helped every driver in America |
| 14:58:11,539 --> 14:58:15,841 | save hundreds on car insurance. |
| 14:58:15,876 --> 14:58:19,617 | Well I'm out of the parking lot. That's a good start. |
| 14:58:19,651 --> 14:58:22,318 | GEICO, fifteen minutes could save you fifteen percent, |
| 14:58:22,353 --> 14:58:30,759 | or more on car insurance. |
| 14:58:41,102 --> 14:58:44,838 | >>> IT IS THAT TIME AGAIN, YOU |
| 14:58:44,906 --> 14:58:48,673 | GUYS ARE SAYING YOU NEVER GLOAT, |
| 14:58:48,741 --> 14:58:49,173 | YOU NEVER BRAG. |

FIG. 3

STX output (start. -- indicates low confidence word. Only text shown in illustration - timestamps are omited):

And timing in in his head disaster it's easier to --

He had great guys that you guys were like saying that you never -- to never brag ...

Best alignment of candidate caption file to speech to text output (start)

STX: \*\*\*\*\* \*\*\*\*\*\*\*\*\*\* \*\*\*\*\*\*\* \*\*\* \*\*\*\*\*\*\*\*\* \*\*\* \*\*\*\*\*\*\*\*\* \*\* \*\*\*\*\*\* \*\*\* \*\*\*\*\*\*\*\*\*\*\* \*\*\*\*\*\*\*\*\* \*\*\*\*\*\*\*\*\*\*
\*\* \*\*\*\*\*\*\* \*\*\*\*\*\*\* \*\*\*\*\*\* \*\*\* \*\*\* \*\*\*\*\*\*\*\* \*\*\*\*\*\*\*\* \*\*\*\*\*\*\*\*\* \*\* \*\*\*\* \*\*\*\*\* \*\*\*\*\* \*\*\*\*\* \*\*\*\*\*\*\*\* \*\*\*\*\*\*
\*\*\*\*\*\*\*\*\*\*\*\*\*\*\* \*\*\*\* \*\*\*\*\*\*\*\*\* \*\*\* \*\*\*\*\* \*\*\*\*\* \*\* \*\*\* \*\*\* \*\*\*\*\*\*\*\*\*\* \*\*\*\*\*\*\*\*\*\*\*\*\* \*\*\*\*\*\*\*\* \*\*\*\*\*\*\*\*\* \*\*\*\*
\*\*\*\*\*\* \*\*\* \*\*\*\*\*\*\*\*\*\*\* \*\*\* \*\*\*\* \*\*\* \*\*\*\*\* \*\*\* \*\*\* \*\*\*\*\*\*\*\*\*\*\* \*\*\* \*\*\* \*\*\*\*\*\*\*\*\*\*\*\*\* \*\*\*\*\* \*\*\*\*\*\*\*\*\*\* \*\*\*\*\*\*\*
\*\*\*\* \*\*\*\* \*\* \*\*\*\* \*\*\*\*\* \*\*\*\*\*\*\*\* \*\*\*\*\*\* \*\*\* \*\*\*\*\*\* \*\*\*\* \*\* \* \*\*\*\*\*\* \*\*\* \*\*\*\*\*\*\*\*\* \*\* \* \*\*\*\*\*\*\* \*\* \*\*\*\*
\*\*\*\*\*\*\*\*\*\*\*\* \* \*\*\*\* \*\*\*\*\*\*\*\* \*\*\*\* \*\*\* \*\* \*\*\*\*\*\*\* \*\*\*\* \*\*\*\*\*\*\* \*\*\*\*\* \*\*\*\*\* \*\* \*\*\*\*\*\* and \* \*\*\*\*\* \*\*\*\* \*\*\*\*\*
\*\*\*\* \*\*\*\*\*\* \*\*\*\*\* TIMING in \*\*\*\*\*\*\* \*\*\*\* \*\*\*\*\*\*\*\* \*\* \*\*\* \*\*\*\*\*\*\*\*\*\* \*\*\*\* \*\*\* \*\*\* \*\* \*\*\* \*\*\*\*\*\*\* \*\*\*\* \*\*\*\*\*\*
\* \*\*\*\* \*\*\*\*\*\* \*\*\*\*\*\* \*\*\*\*\*\*\* \*\*\*\*\*\*\* \*\*\*\*\* IN  HIS HEAD   DISASTER IT'S EASIER TO -- HE       HAD
GREAT GUYS that \*\*\*\* \*\*\*\*\*\* you guys WERE LIKE saying THAT you never --   TO  never brag
CCC: NORTH AMERICA'S NATURAL GAS PRODUCERS ARE COMMITTED TO SAFELY AND
RESPONSIBLY PROVIDING GENERATIONS OF CLEANER BURNING ENERGY FOR OUR COUNTRY.
DRILLING THOUSANDS OF FEET BELOW FRESH WATER SOURCES, WITHIN SELF-CONTAINED WELL
SYSTEMS, AND USING STATE OF THE ART MONITORING TECHNOLOGIES RIGOROUS PRACTICES
HELP ENSURE OUR OPERATIONS ARE SAFE AND CLEAN FOR OUR COMMUNITIES AND THE
ENVIRONMENT. WE'RE AMERICA'S NATURAL GAS. LIKE SO MANY GREAT PIONEERS BEFORE ME,
GUIDED ONLY BY A DREAM. I'M EMBARKING ON A JOURNEY OF EPIC PROPORTION. I WILL TRAVEL,
FROM SEA TO SHINING SEA, THROUGH AMBER WAVES OF GRAIN, and I WON'T STOP UNTIL I'VE
HELPED EVERY DRIVER in AMERICA SAVE HUNDREDS ON CAR INSURANCE. WELL I'M OUT OF THE
PARKING LOT. THAT'S A GOOD START. GEICO, FIFTEEN MINUTES COULD SAVE YOU FIFTEEN
PERCENT, OR  MORE  ON CAR INSURANCE. >>> IT   IS  that TIME AGAIN, you guys \*\*\*\* ARE  saying
\*\*\*\* you never GLOAT, YOU never brag.
Eval: I   I     I    I I     I I    I I   I I     I     I      I I   I   I I I I    I    I      I I I
 I I I    I I     I I    I I  I  I I I I     I      I      I    I I I I       I I I I I I I
 I I I      I I     I    I I I I I  I    I    I I   I  I I I   I I    I I I    I I I     I I   I I
 I I   I I     I  I  I I    I I  I  I  I  I   I  S     I    I I    I I I     I I I I I I   I I  II
  I   I    I    I    I  S S S    S    S  S   S S S    S S  S     I I          D  S     D          S   S (I = insertion, D = deletion, S = substitution)

FIG. 4

Largest island in this starting segment (STX utterance with greatest # of matches form island):

STX: HE      HAD GREAT GUYS that ** **** you guys WERE LIKE saying THAT you never --
CCC: INSURANCE. >>> IT   IS   that TIME AGAIN, you guys ** ARE  saying ** you never GLOAT Final closed caption file after alignment after adjusting boundaries:

00:00:10,339 # 00:00:11,434 # or more on car insurance.

00:00:11,434 # 00:00:12,748 # IT IS THAT TIME AGAIN, YOU

00:00:12,748 # 00:00:14,259 # GUYS ARE SAYING YOU NEVER GLOAT,

00:00:14,259 # 00:00:15,009 # YOU NEVER BRAG.

...

Actual audio in start of clip:

[music] It is that time again It is Herb's disaster du jour.

Just during the ad break, you guys, you guys were saying you never gloat, you never brag

ALIGNING VIDEO CLIPS TO CLOSED CAPTION FILES

BACKGROUND OF THE INVENTION

The invention generally relates computer systems and computer executed methods for aligning video clips to closed caption files.

In general, video clips are short clips of video, usually part of a longer recording. If video clips originate from broadcast video content (e.g., over-the-air, cable, satellite, and so forth), there is frequently closed captioning associated with the broadcast. In general, closed captioning is the process of displaying text on a television, video screen or other visual display to provide additional or interpretive information to individuals who wish to access it. Closed captions typically show a transcription of the audio portion of a program as it occurs (either verbatim or in edited form), sometimes including non-speech elements.

Making video clips on the web, on smart phones, and so forth, matched up to the relevant closed caption text is less expensive than human transcription and yields better results than purely automated speech-to-text methods as the closed caption files were generated by a human. However, typically the closed caption will not exactly match the spoken words; it is usually quite different as the closed captioner focuses on important words, s/he makes mistakes, and so forth.

The closed caption also lags the broadcast video as the close captioner needs to watch/hear the video and then input the corresponding closed caption. This lag varies. For prerecorded (as opposed to live) content, there may be no lag at all because the lag was already edited out. If one uses an automated technique, such as speech-to-text, to generate words from the video clip to assist in an alignment process, there will often be recognition errors. A variability in lag along with the errors in both the closed caption text and speech-to-text make alignment complicated.

Further, many media broadcasters do not have the closed caption text readily available, so frequently, one needs to capture closed captions from a live broadcast stream.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for aligning video clips to closed caption files.

In general, in one aspect, the invention features a method including, in a computer system, receiving a video clip, applying speech-to-text to the received video clip, applying an initial alignment of the speech-to-text output to candidate closed caption text in a closed caption file, identifying one or more islands, and outputting the video clip with the aligned closed caption text.

BRIEF DESCRIPTION OF THE DRAWINGS

The invention will be more fully understood by reference to the detailed description, in conjunction with the following figures, wherein:

FIGS. 3, 4 and 5 show an illustrative alignment.

DETAILED DESCRIPTION

Figure 1:
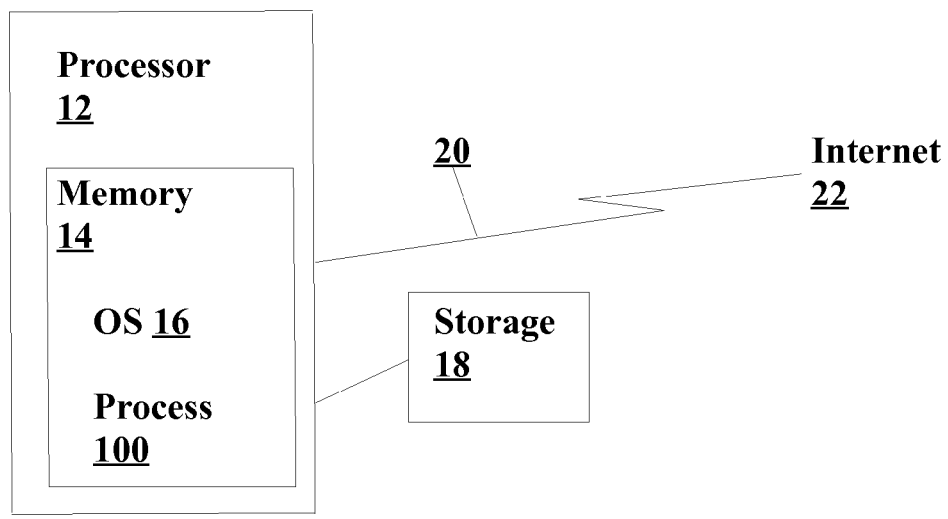
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, a system 10 includes a processor 12 and memory 14. Memory 14 includes a operating system (OS) 16, such as Linux®, Snow Leopard® or Windows®, and a process 100 for aligning video clips to closed caption files. The system 10 may include a storage device 18 and a communications link 20 to a network of interconnected computers 22 (e.g., the Internet).

Figure 2:
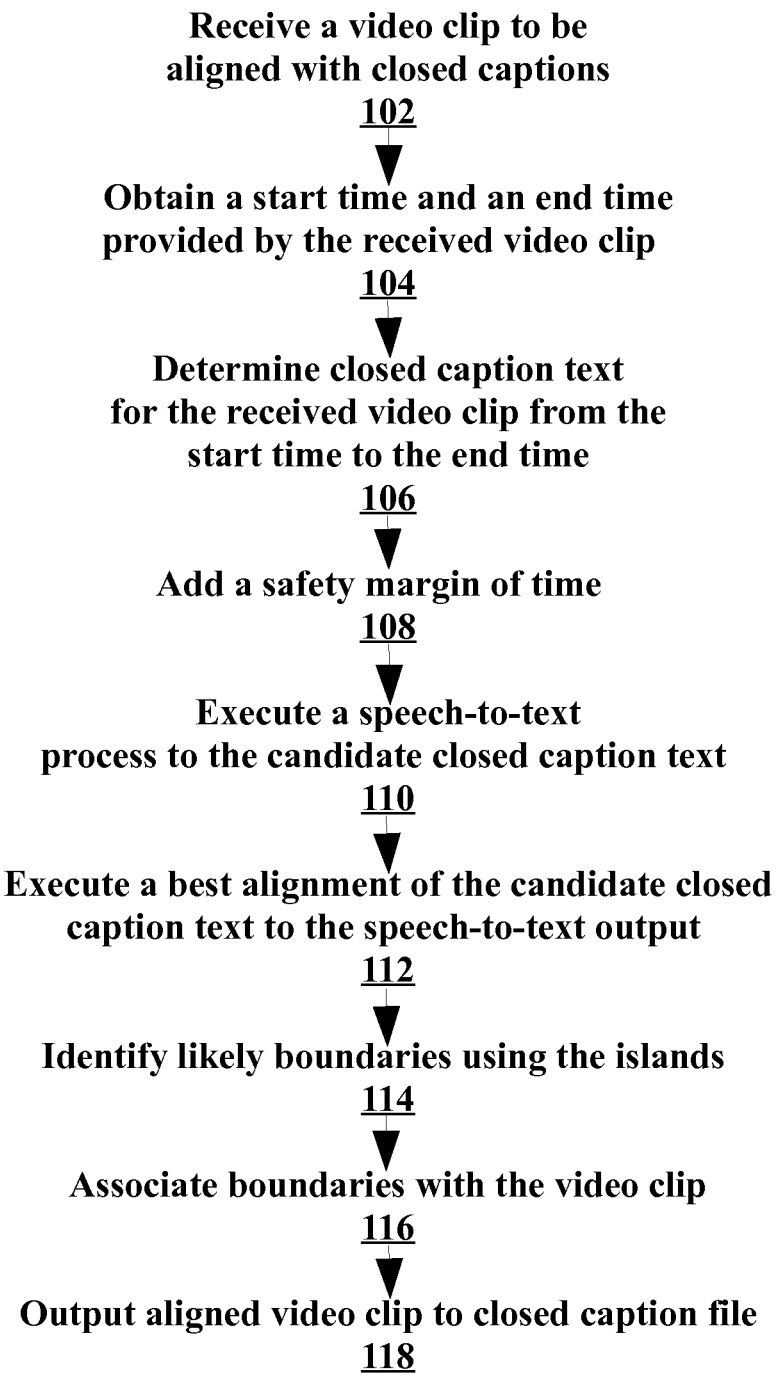
FIG. 2 is a flow diagram.

As shown in FIG. 2, the process 100 for aligning video clips to closed caption files includes (102) receiving a video clip to be aligned with closed captions. Closed captions can include subtitles, subtext, a summary that is approximately contemporaneous with the words spoken, and verbal descriptions of what's happening in the video but not actually spoken.

Process 100 obtains (104) a start time and an end time provided by the received video clip. The start time and the end time may be off by up to several minutes.

Process 100 determines (106) closed caption text for the received video clip from the start time to the end time and adds (108) a safety margin of time. The determined closed caption text is referred to as the candidate closed caption text.

Process 100 executes (110) a speech-to-text process to the candidate closed caption text.

Process 100 executes (112) a best alignment of the candidate closed caption text to the speech-to-text output. The best alignment can use one of numerous techniques, such as, for example, dynamic programming algorithms to minimize the number of mismatches. Certain error types may be considered worse than others in a scoring. Some words or word patterns might may be given a penalty of zero if, for example, they are likely to be omitted from the closed caption.

Sequences within the alignment that "match well" form islands. Matching well may be determined by criteria including, for example, contiguous matches, contiguous matches except for certain types of errors like insertions and deletions, allowing for a small ratio of errors, such as up to one in every four contiguous words, and so forth. Alternatively, process 100 can rank the sentences by the number of matching words in each sentence and consider the top N to form islands, where M may be 1. It should be noted that "sentence" may not necessarily be a linguistic sentence, but may be one selected by the speech to text process (e.g., a pause during speech may be labeled as a sentence boundary by speech to text).

Process 100 identifies (114) likely boundaries using the islands. For example, consider a 10 minute video clip. If the largest island corresponds to time 1 m 0 s to 8 m 0 s (2 m 0 s from the end) in the video clip and time 2 m 0 s to time 9 m 0 s in the candidate closed caption file, the likely start/end boundaries are 1 m 0 s and 11 m 0 s in the closed caption file (because we started 1 m 0 s from start of clip and ended 2 m 0 s from end of clip, so those offsets are added to the island.

Process 100 can perform one or more passes in identifying islands and boundaries, and may add some padding to the boundaries to allow for slight errors. Process 100 may use either word or sentence time stamps from the speech-to-text transcript for boundaries identification.

In some passes, process 100 may take boundaries identified in a previous pass, and move the end points identified in a previous pass by finding very near islands matching a minimum criteria, as opposed to maximizing the island size. For example, in pass 1, process 100 may find the largest island to infer candidate end points, and then in pass 2, process 100 may adjust the end points by finding the location of the nearest three word match. This three word match may permit skipping over certain errors, such as insertions and deletions. Thus, a three word match excluding insertions and deletions becomes the minimum criteria in this example.

A common pattern is that a headline is repeated twice, both as an introductory prelude, and later in the video clip itself. For example, the closed caption may have "Coming up next: Does it pay to play it safe in this economy? <intervening words> We asked the question does it pay to play it safe in this economy? . . . " with the actual clip starting at "We asked the question . . . ." Multiple passes are particularly useful for eliminating the introductory prelude in the first pass, and later to refine the location of the boundaries.

Once process 100 has determined a final set of candidate end point boundaries, process 100 takes the corresponding portion of the closed caption file and associates (116) it with the video clip.

Process 100 may further perform a sentence level or word level realignment of a final portion of the closed caption file and the video clip to output a fully aligned closed caption to the video clip data structure.

If the final alignment error rate is too high or if any of the passes should fail, process 100 can label the alignment as having failed instead of returning a low quality alignment.

Process 100 outputs (118) the aligned video clip to closed caption file.

To better understand the invention, FIGS. 3, 4 and 5 show an illustrative alignment of video clips to closed caption files.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. Accordingly, other implementations are within the scope of the following claims.

What is claimed is:

1. A method comprising:
   in a computer system, receiving a video clip;
   applying speech-to-text to the received video clip;
   applying an initial alignment of the speech-to-text output to candidate closed caption text in a closed caption file;

identifying one or more islands, each of the one or more islands representing sequences within the initial alignment that match well; and outputting the video clip with the aligned closed caption text.

2. The method of claim 1 wherein identifying one or more islands further comprises determining start/end closed caption boundaries for an alignment based on the one or more islands.

3. The method of claim 1 wherein the initial alignment comprises dynamic programming.

4. The method of claim 1 wherein the initial alignment comprises optimizing criteria relating to insertions, substitutions and deletions.

5. The method of claim 1 wherein identifying one or more islands comprises finding a sequence with the greatest number of matches.

6. The method of claim 1 wherein sentence or utterance boundaries are used to mark a start/end of the sequence.

7. The method of claim 1 wherein applying an initial alignment of the speech-to-text output to a candidate closed caption text further comprises applying one or more subsequent alignments of the speech-to-text output to the candidate closed caption text.

8. The method of claim 7 wherein applying one or more subsequent alignments comprises adjusting the boundaries determined in a previous pass.

9. The method of claim 1 wherein the closed caption file is obtained by recording a broadcast.

10. The method of claim 1 wherein the closed caption file comprises subtitles, subtext, a summary that is approximately contemporaneous with the words spoken, and/or verbal descriptions of what's happening in the video but not actually spoken.

11. The method of claim 1 wherein the video clip with the aligned closed caption text is in a file format selected from the group consisting of Extensible Markup Language (XML), SubRip (.SRT) and Synchronized Multimedia Integration Language (SMIL).

12. A server comprising:
a communications link;
a processor; and
a memory, the memory comprising an operating system and a process for aligning video clips to closed caption files, the process comprising:

receiving a video clip;
applying speech-to-text to the received video clip;
applying an initial alignment of the speech-to-text output to candidate closed caption text in a closed caption file;
identifying one or more islands, each of the one or more islands representing sequences within the initial alignment that match well; and
outputting the video clip with the aligned closed caption text.

13. The server of claim 12 wherein identifying one or more islands further comprises determining start/end closed caption boundaries for an alignment based on the one or more islands.

14. The server of claim 12 wherein the initial alignment comprises dynamic programming.

15. The server of claim 12 wherein the initial alignment comprises optimizing criteria relating to insertions, substitutions and deletions.

16. The server of claim 12 wherein identifying one or more islands comprises finding a sequence with the greatest number of matches.

17. The server of claim 12 wherein sentence or utterance boundaries are used to mark a start/end of the sequence.

18. The server of claim 12 wherein applying an initial alignment of the speech-to-text output to a candidate closed caption text further comprises applying one or more subsequent alignments of the speech-to-text output to the candidate closed caption text.

19. The server of claim 18 wherein applying one or more subsequent alignments comprises adjusting the boundaries determined in a previous pass.

20. The server of claim 12 wherein the closed caption file is obtained by recording a broadcast.

21. The server of claim 12 wherein the closed caption file comprises subtitles, subtext, a summary that is approximately contemporaneous with the words spoken, and/or verbal descriptions of what's happening in the video but not actually spoken.

22. The server of claim 12 wherein the video clip with the aligned closed caption text is in a file format selected from the group consisting of Extensible Markup Language (XML), SubRip (.SRT) and Synchronized Multimedia Integration Language (SMIL).

\* \* \* \* \*